Dec. 6, 1938.　　　　F. G. SIMON　　　　2,139,424

FISH BAIT OR LURE

Filed Aug. 9, 1937

Inventor

Frederick G. Simon,

By

Attorneys

Patented Dec. 6, 1938

2,139,424

UNITED STATES PATENT OFFICE 2,139,424

FISH BAIT OR LURE

Frederick G. Simon, Detroit, Mich.

Application August 9, 1937, Serial No. 158,010

2 Claims. (Cl. 43—45)

This invention relates to an artificial fish bait or lure and more particularly to a device of this character especially adapted for casting or trolling.

An object of the invention is to provide a device of simple construction which may be cheaply manufactured and is especially effective due to its particular construction and operation. A further object is to provide a device for the purpose in which the shank of the hook or hooks is guided and held in alinement with the body or spinner so that there is no danger of the hooks becoming entangled in the spinner and the hooks are always held in position at the rear end of the body in a position to snare the fish.

Further it is an object of the invention to so construct the device that it will spin as a whole in being drawn through the water and the spinner in passing through the water will produce a swirling action to attract the fish and because of its shape will have the appearance of a minnow.

It is also an object to provide a construction in which the body is tubular and formed with a longitudinally extending spiral and with blades at its head end to produce a rapid rotation when drawn through the water, the water passing through the tubular body and producing bubbles, the whole simulating the appearance of a minnow, and the body blades and spiral ribs or fins, all being formed of thin sheet metal, the parts being made in two halves stamped out and formed up, each from a single blank.

It is also an object to provide a construction wherein the hooks are not liable to become fouled in the weeds, and if they do pick up weeds, the construction is such that in the operation of the device in passing through the water, the hooks will be freed from the weeds.

A further object is to provide certain other new and useful features in the construction, arrangement and combination of parts, all as hereinafter more fully set forth, reference being had to the accompanying drawing in which, Figure 1 is a side elevation of a device illustrative of an embodiment of the present invention;

Figure 1:
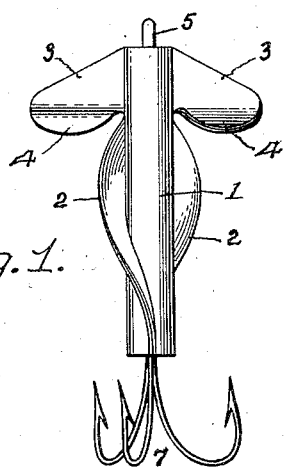
Figure 4:
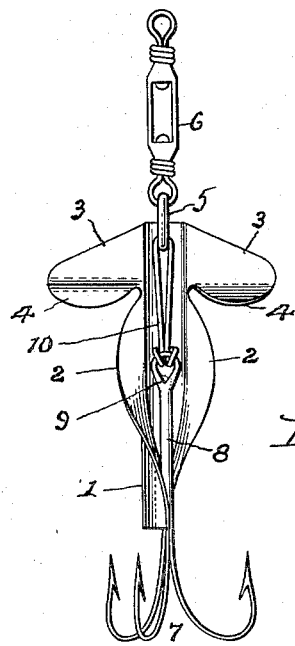
Fig. 4 is an elevation similar to Fig. 1 with one of the two halves of the spinner or body removed and showing the internal construction.
Figure 2:
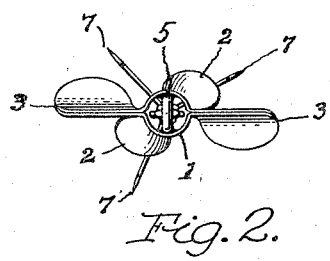
Fig. 2 is an end elevation of the same.
Figure 3:
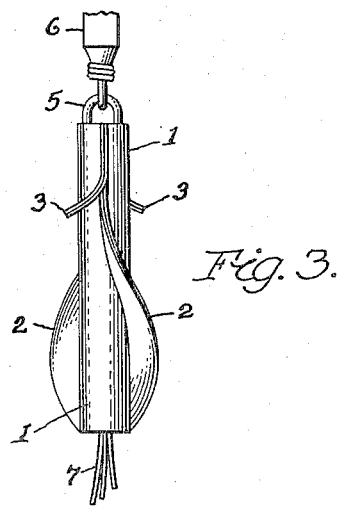
Fig. 3 is a view taken at right angles to that of Fig. 1.

As shown, the device comprises a tubular body 1 having integral longitudinally extending spiral ribs or fins 2 extending laterally from the body in opposite directions, and extending laterally from the forward end of the body are blades 3, these blades being bent laterally in opposite directions at their rear edges as at 4. The body 1, the fins 2 and the blades 3 are all formed from two sheet metal blanks, that is, two thin sheets of metal which are blanked out and then each formed up to form one-half of the tubular body with the fins and blades extending laterally therefrom, and then the two blanks forming the two halves of the body are secured face to face by soldering or other suitable means, a link or loop 5 of rigid metal being secured by soldering or otherwise within the forward end of the body to project therefrom and for the attachment of one end of a swivel 6 thereto, the opposite end of the swivel being formed with a loop to which the fish line is attached, the swivel being of any suitable well known construction.

As shown the fish hook 7 is of multiple form, the shanks of the several hooks being united into one shank 8 which is formed with an eye 9 at its end, the shank of the hooks being inserted within the open lower end of the tubular body and, to hold the shank in place therein, a flexible member such as a piece of ordinary line 10 is secured to the eye 9 of the hook shank within the tubular body and is passed through the loop 5 which is rigid with the forward end of the body. The shank of the hook therefore has a limited rotative movement within the body, that is, it may be rotated relative to the body because of its flexible connection 10 to the forward end of the body and this rotation may continue in one direction relative to the body until the connection 10 is fully twisted, when the force of such twist will finally cause the hook shank to rotate in an opposite direction so that, if weeds should be caught on one of the hooks while the lure is rotating as a whole, a drag will be put on that particular hook which will retard the rotation of the hooks with the body and thus twist the flexible connection 10 until such time as the connection is fully twisted and exerts sufficient force to turn the hooks in the opposite direction thereby tending to disengage the hook which is fouled by the weeds from engagement therewith.

As the head end of the body is formed with the laterally extending blades, the rear edges of which are inclined or bent in opposite directions, these blades form a propeller to rapidly rotate the body and this rotation is assisted by the spirally extending ribs or fins 2. This arrangement of body and blades simulates the appearance of a minnow passing rapidly through the water and as the shank 8 of the hooks extends into the tubular body the hooks are guided by the body and held in perfect alinement therewith and are rotated by the rotation of the body, and as the line is attached to the forward end of the body by means of the swivel 6, the body and hooks are both rapidly rotated as the lure is drawn through the water and because of such rapid rotation the hooks are not readily discernible.

The device is cheap to maufacture because the body together with the blades and spiral fins are formed from like blanks or stampings which are simply secured together to provide a tubular body with the laterally extending blades and fins and, as the body when so formed becomes an open straight tube, water will enter the forward end of this tube and be ejected from the rear end thereof around the hooks, producing bubbles which further camouflage the device in use.

Obviously the form and construction of the body may be modified without departing from the spirit of the invention and I do not therefore limit myself to the particular construction shown.

Having thus fully described my invention what I claim is:

1. A casting bait or lure including a body and laterally extending fins and blades formed of two like sheet metal stampings secured face to face and providing a tubular open ended body having longitudinally extending spiral fins and laterally extending blades at its forward end with said blades bent in opposite directions at their rear edges, a rigid loop secured within the forward open end of the tubular body, a hook assembly having a shank extending into the rear end of the tubular body and provided with an eye at its end, a flexible member attached to said eye within the tubular body and to said rigid loop at the open forward end of the body, said flexible member being adapted to be twisted by relative rotation of said body and shank, and a swivel attached at one end to said rigid loop and formed at its opposite end with means for attachment of a fish line thereto, whereby the body and hook assembly may rotate freely relative to the fish line when drawn through the water.

2. A device or the purpose described including a tubular body having integral laterally extending members to rotate the body as it is drawn through the water, said body and members comprising two like sheet metal blanks secured together face to face, means for attaching a fish line to the forward end of the body, a fish hook having a shank extending into the rear open end of the body, and a flexible member within the body attached to the end of the shank of the hook at one end and at its opposite end to the body adjacent the forward end thereof.

FREDERICK G. SIMON.